(12) United States Patent
Eis et al.

(10) Patent No.: US 6,430,905 B2
(45) Date of Patent: Aug. 13, 2002

(54) HYDRAULIC DRIVE FOR A FEEDER MECHANISM IN A MATERIAL PICK-UP DEVICE

(75) Inventors: Günter Eis, Harsewinkel; Norbert Strieker, Gütersloh, both of (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 23 days.

(21) Appl. No.: 09/761,036

(22) Filed: Jan. 16, 2001

(30) Foreign Application Priority Data

Mar. 14, 2000 (DE) .......................... 100 12 056

(51) Int. Cl.$^7$ .............................................. A01D 69/03
(52) U.S. Cl. ........................ 56/11.2; 56/11.9; 56/14.2
(58) Field of Search .................. 56/11.9, 10.9, 56/10.8, 12.4, 11.2, 221, 222, 220, 11.1, 14.5, 14.2, 364; 60/452

(56) References Cited

U.S. PATENT DOCUMENTS

| | | | | |
|---|---|---|---|---|
| 4,663,919 A | * | 5/1987 | Stroh et al. | 56/11.2 |
| 5,462,486 A | * | 10/1995 | Scott | 460/20 |
| 5,791,128 A | | 8/1998 | Rogalsky | |
| 5,996,324 A | * | 12/1999 | Oligmueller | 56/11.2 |
| 6,247,296 B1 | * | 6/2001 | Becker et al. | 460/20 |

* cited by examiner

Primary Examiner—Thomas B. Will
Assistant Examiner—Meredith C. Petravick
(74) Attorney, Agent, or Firm—Husch & Eppenberger, LLC; Robert E. Muir

(57) ABSTRACT

A hydraulic reel drive wherein the reel motor is driven by a hydraulic pump, which is adjustable in a continuous manner and operates therewith in a closed oil circulating system. The advantage of this arrangement is that the reel always rotates uniformly independently of the instantaneous load thereon. Another advantage thereof is that by using a hydraulic pump, which is adjustable in a continuous manner, only that amount of oil is ever circulated as is required to drive the reel at a predetermined rotational speed.

20 Claims, 2 Drawing Sheets

HYDRAULIC DRIVE FOR A FEEDER MECHANISM IN A MATERIAL PICK-UP DEVICE

BACKGROUND OF THE INVENTION

The invention relates to a material pickup device provided with feeder mechanism for an agricultural harvesting machine which comprises a hydraulic drive consisting of a motor and a pump for a feeder mechanism of the material pick-up device.

In particular, the material pickup device may be a cutter bar for a self-propelled combine harvester. For the purposes of driving a feed reel as the feeder mechanism for a cutter bar in a self-propelled combine harvester, a constant displacement gear pump has been used until now, this pump having to be designed to be large enough to supply the necessary quantity of oil to the reel motor at full load. When the power requirements are lower than for a full load, the excess quantity of oil, which is delivered by the gear pump but is not required by the reel motor, is returned directly to the tank via a feed control valve connected between the gear pump and the reel motor. Due to the fact that the gear pump must always deliver the maximum amount of oil needed by the reel motor even though this quantity of oil is only required on rare occasions, the efficiency level of this type of reel drive is very low. Another disadvantage resides in the fact that the oil flows freely back into the tank from the outlet side of the reel motor so that it is not possible to ensure proper oil circulation when there is a change in load. Furthermore, in the case of the known reel drive, there is the disadvantage that additional valves must be employed and controlled when reversing the reel.

The present invention is directed to overcoming one or more of the problems set forth above.

SUMMARY OF THE INVENTION

An aspect of the present invention is to design the hydraulic drive for a feeder mechanism of a material pickup device in an agricultural harvesting machine such as to ensure the provision of a highly efficient, stable, oil circulation system which is easily reversible without involving additional expenditure.

Another aspect of this invention is for the drive pump for the motor of the feeder mechanism is a hydraulic pump whose delivery rate is adjustable in a continuous manner by means of a control lever, and in that the hydraulic pump and the motor of the feeder mechanism operate in a closed oil circulating system. With a drive for the feeder mechanism constructed in this manner, the hydraulic pump delivers just that quantity of oil, which the motor needs for its instantaneous operation. Moreover, it is ensured that the circulation of the oil is stable due to the functioning of the closed oil circulating system.

Yet another aspect of the invention envisages that a first line should lead to the inlet side of the hydraulic pump from a line connected to the low-pressure side of the hydrostatic drive for the vehicle and that another line should lead therefrom to the outlet side of the hydraulic pump, said first line and said other line each incorporating a respective non-return valve which blocks the return flow of oil from the hydraulic pump to the line which is connected to the hydrostatic drive for the vehicle. By virtue of such an arrangement, it is ensured that any lack of oil in the closed operational circulation system for the hydraulic pump and the motor is always replaced.

Still another aspect of the invention is a tank line incorporating a scavenger valve is branched off from that particular line leading from the motor to the hydraulic pump which forms the return line during the normal material feed operation. By virtue of such a known scavenger valve, it is ensured that a certain amount of oil can always flow into the tank from the closed oil circulating system and that this quantity will be replaced by fresh oil, namely, by the arrangement which was described in more detail in the following Paragraph:

During a reversing process, the feeder mechanism is driven at lower rotational speeds, from which it follows that the hydraulic pump must be set such that it will only deliver a small flow of oil. However, since a scavenger valve is employed during the reversing process in the line leading from the hydraulic pump to the motor, there is a danger that too large a quantity of oil will be branched off through the scavenger valve and fed into the tank so that there will be too little oil available for operating the motor correctly. In order to prevent this situation, the invention proposes that the scavenger valve be blocked during the reversal of the feeder mechanism, for example, for the purposes of removing a blockage of material, namely, by means of the pressurized oil itself which is flowing from the hydraulic pump to the motor. Naturally, during the reversal process, it is always possible to increase the rotational speed of the feeder mechanism so as to accelerate the clearance of the cutter plate with the help of the feeder mechanism.

Still another aspect of this invention is to actuate the control lever of the hydraulic pump by means of a linear drive, for example a piston-cylinder unit, via a 3/3-way valve in such a manner that the control lever is adjustable from a neutral position merely to one side. For the purposes of reversing, it is then only necessary to reverse the direction of rotation of the hydraulic pump.

The above aspects are merely illustrative of some of the numerous aspects associated with this invention and should not be construed as all-inclusive.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
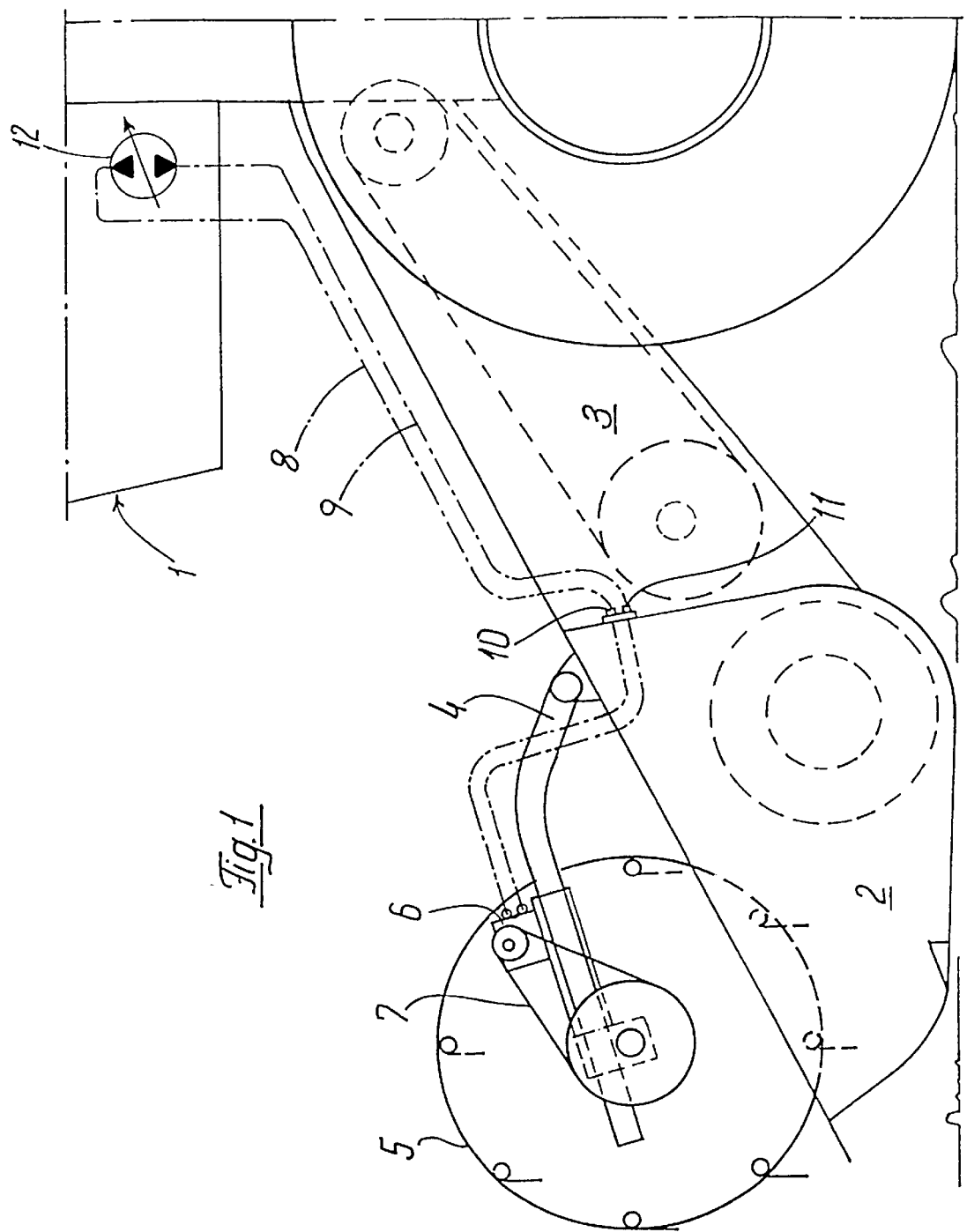
FIG. 1 shows a side view of a self-propelled combine harvester.
Figure 2:
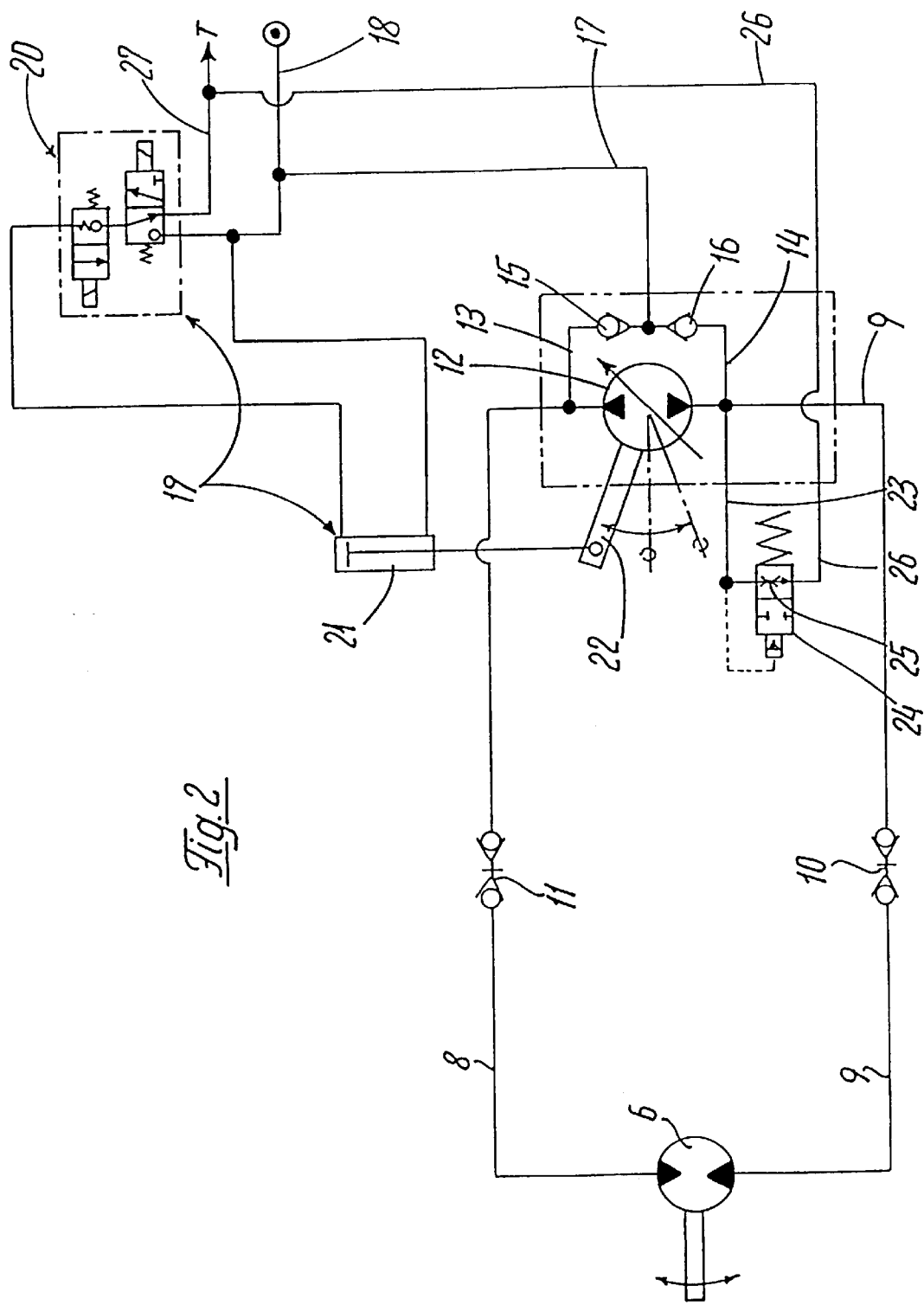
FIG. 2 is a layout diagram for the operation of the reel in the combine harvester of FIG. 1.

A material pickup device in the form of a cutter bar trough 2 is mounted via a feed rake 3 on the front end of a self-propelled combine harvester 1. The reel 5, as an example of a feeder mechanism, is connected in a conventional manner to the cutter bar trough 2 via arms 4. The reel 5 is driven by a reel motor 6 and a chain 7 associated therewith. Lines 8 and 9 lead from this reel motor 6 to quick release couplings 10 and 11, and from there, they extend to a hydraulic pump 12. The hydraulic pump 12 is connected in a manner to the drive for the cutter bar, for example, and runs backwards or forwards therewith, as required, in dependence on its direction of rotation. In the embodiment illustrated, the line 8 represents the forward flow line, while the line 9 represents the return line during the feeding operation of the reel 5. Lines 13 and 14 are branched-off from the lines 8 and 9 in the vicinity of the pump 12, a respective non-return valve 15 and 16 being incorporated in said lines 13 and 14. From there, the two lines 13 and 14 flow into a line 17, which is connected to the line 18. The line 18 is branched-off from the hydrostatic drive for the combine harvester and is at a pressure of approximately 20 bar. The non-return valves 15 and 16 are incorporated in the lines 13 and 14 in such a manner that oil can be supplied to the closed oil circulating system (reel motor 6, lines 8 and 9 and the hydraulic motor 12) as required at any time. Furthermore, the low-pressure line 18 is connected to a hydraulic linear drive, which is generally indicated by numeral 19. This hydraulic linear drive 19 includes a 3/3-way valve 20, a hydraulic piston-cylinder unit 21 and a control lever 22, which is actuatable by the hydraulic piston-cylinder unit 21. The flow rate of the hydraulic pump 12 can be continuously adjusted by means of this control lever 22 from zero up to a maximum value. As can be seen from the layout diagram of FIG. 2, a line 23 is extended from the return flow line 9 to a scavenger valve 24, which is provided with a diaphragm 25. A further line 26 is connected from this diaphragm 25, i.e., from the scavenger valve 24 to the tank line 27, which emerges from the 3/3-way valve 20. In normal operation, the control lever 22 is set by the valve 20 such that oil emerging from the hydraulic pump 12 flows via the line 9 and the quick release coupling 10 to the reel motor 6 and from there via the line 8 and the quick release coupling 11 back to the motor. A small quantity of oil from the return oil stream in the line 23 is branched-off by the diaphragm 25 to the lines 26 and 27. Thus, the diverted quantity of oil is constantly replaced via the lines 17 and 13. In order to alter the direction of rotation of the reel 5, which may be required when the feeder mechanism is blocked, for example, the direction of rotation of the hydraulic pump 12 is merely altered so that the oil delivered by the pump 12 is fed via the line 9 to the reel motor 6 and from there via the line 8 back to the hydraulic motor 12. In order to prevent oil being branched off through the scavenger valve 24 from the forward oil stream during the reversal process, this scavenger valve 24 is designed such that it is closed by the oil pressure existing in the line 9 which forms the forward line to the reel motor 6 during the reversal process.

Other aspects, objects and advantages of the present invention can be obtained from a study of the drawings, the disclosure and the appended claims.

What is claimed is:

1. A material pickup device provided with a feeder mechanism for an agricultural harvesting machine which comprises:
   a hydraulic drive that includes a motor and a hydraulic pump for the feeder mechanism of the material pick-up device, a control lever for adjusting a flow rate of the hydraulic pump in a continuous manner, and wherein the hydraulic pump and the motor of the feeder mechanism are in fluid communication and operate in a closed oil circulating system.

2. The material pickup device according to claim 1, further including a first line that is in fluid communication with an inlet side of the hydraulic pump and is in fluid communication with a hydraulic drive line connected to a low-pressure side of the hydraulic drive for the feeder mechanism and a second line that is in fluid communication with an outlet side of the hydraulic pump and is in fluid communication with a hydraulic drive line connected to the low-pressure side of the hydraulic drive for the feeder mechanism, wherein the first line and the second line each include a non-return valve that blocks a return flow of oil from the hydraulic pump to the hydraulic drive line connected to the low-pressure side of the hydraulic drive for the feeder mechanism.

3. The material pickup device according to claim 2, further including a tank line incorporating a scavenger valve that is branched-off from a return line and in fluid communication therewith, wherein the return line is located between the motor and the hydraulic pump during the normal material feed operation.

4. The material pickup device according to claim 3, wherein the scavenger valve is self-blocking during a reversal process of the feeder mechanism.

5. The material pickup device according to claim 4, wherein the scavenger valve blocks a flow of oil from the hydraulic pump to the motor to reverse the feeder mechanism.

6. The material pickup device according to claim 3, wherein the scavenger valve blocks a flow of oil from the hydraulic pump to reverse the feeder mechanism.

7. The material pickup device according to claim 2, wherein the control lever of the hydraulic pump is actuatable through a linear drive.

8. The material pickup device according to claim 7, wherein the linear drive includes a hydraulic piston-cylinder unit in fluid communication with a control valve.

9. The material pickup device according to claim 8, wherein the control valve is a 3/3-way valve.

10. The material pickup device according to claim 2, wherein oil utilized in the closed oil circulating system is derived from the hydraulic drive associated with the feeder mechanism for an agricultural harvesting machine.

11. The material pickup device according to claim 1, further including a tank line incorporating a scavenger valve that is branched-off from a return line and in fluid communication therewith, wherein the return line is located between the motor and the hydraulic pump during the normal material feed operation.

12. The material pickup device according to claim 11, wherein the scavenger valve blocks a flow of oil from the hydraulic pump to reverse the feeder mechanism.

13. The material pickup device according to claim 11, wherein the scavenger valve is self-blocking during a reversal process of the feeder mechanism.

14. The material pickup device according to claim 13, wherein the scavenger valve blocks a flow of oil from the hydraulic pump to the motor to reverse the feeder mechanism.

15. The material pickup device according to claim 1, wherein the control lever of the hydraulic pump is actuatable through a linear drive.

16. The material pickup device according to claim 15, wherein the linear drive includes a hydraulic piston-cylinder unit in fluid communication with a control valve.

17. The material pickup device according to claim 16, wherein the control valve is a 3/3-way valve.

18. The material pickup device according to claim 1, wherein oil utilized in the closed oil circulating system is derived from the hydraulic drive associated with the feeder mechanism for an agricultural harvesting machine.

19. A process for operating a material pickup device provided with a feeder mechanism for an agricultural harvesting machine which comprises:
   continuously adjusting a flow rate of a hydraulic pump with a control lever, wherein the hydraulic pump functions a component of a hydraulic drive for the feeder mechanism of the material pick-up device that includes a motor, wherein the hydraulic pump and the motor of the feeder mechanism are in fluid communication and operate in a closed oil circulating system.

20. The process for operating a material pickup device according to claim 19, further including:

blocking a first line and a second line each with a non-return valve that blocks a return flow of oil from the hydraulic pump to the hydraulic drive line that is connected to the low-pressure side of the hydraulic drive for the feeder mechanism, wherein the first line is in fluid communication with an inlet side of the hydraulic pump and is in fluid communication with a hydraulic drive line connected to a low-pressure side of the hydraulic drive for the feeder mechanism and the second line is in fluid communication with an outlet side of the hydraulic pump and is in fluid communication with a hydraulic drive line connected to the low-pressure side of the hydraulic drive for the feeder mechanism.

* * * * *